United States Patent [19]

Giebel et al.

[11] Patent Number: 4,767,346
[45] Date of Patent: Aug. 30, 1988

[54] PRESSURE SEAL GROUNDED POTENTIAL BUSHING FOR CABLE FITTINGS

[75] Inventors: Wolfgang Giebel, Planegg; Dieter Kunze, Neuried, both of Fed. Rep. of Germany

[73] Assignee: Siemens Aktiengesellschaft, Berlin and Munich, Fed. Rep. of Germany

[21] Appl. No.: 913,346

[22] Filed: Sep. 30, 1986

[30] Foreign Application Priority Data

Oct. 3, 1985 [DE] Fed. Rep. of Germany ....... 3535387

[51] Int. Cl.$^4$ .................... H01R 13/46; F16K 15/06
[52] U.S. Cl. ...................................... 439/95; 137/540; 439/206
[58] Field of Search ............ 339/14 R, 117 R, 117 P; 439/92, 95, 206; 137/540

[56] References Cited

U.S. PATENT DOCUMENTS

| 1,036,244 | 8/1912 | Hooper | 137/540 X |
| 2,503,459 | 4/1950 | Thornberry | 339/147 R X |
| 3,079,947 | 3/1963 | Hunt et al. | 339/147 |
| 3,189,046 | 6/1965 | Callahan et al. | 137/540 X |
| 3,393,702 | 7/1968 | Ferrill | 137/540 X |
| 3,916,130 | 10/1975 | Cade | 339/117 P |

Primary Examiner—Z. R. Bilinsky

[57] ABSTRACT

A pressure sealed grounded potential bushing in cable fittings which is charged with pressurized gas such that the bushing has a lead-through opening in which an access pressure safety device is mounted so as to prevent excessive pressure. A valve includes a seat and spring arrangement such that the valve opens under excess pressure by moving against the bias of the spring.

7 Claims, 2 Drawing Sheets

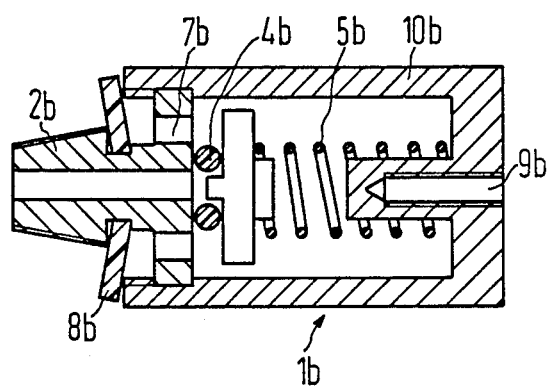

PRESSURE SEAL GROUNDED POTENTIAL BUSHING FOR CABLE FITTINGS

BACKGROUND OF THE INVENTION

1. Field of the Invention

This invention relates in general to pressure-tight grounded potential bushings and cable fittings which are charged with pressurized gas.

2. Description of the Prior Art

Plastic boxes which are charged with pressurized gas give rise to a danger that the plastic boxes will burst due to excessive high pressures which might occur with improper handling and such ruptures can occur in the walls, in the closing areas or in the outer seals. Without using special mounting arrangement, it is not possible for safety measures against the inadmissible high pressures to be prevented in conventional prior art boxes.

SUMMARY OF THE INVENTION

It is an object of the present invention to provide in traditional plastic boxes a pressure release safety means. This object is achieved using a pressure-tight grounded potential bushing wherein the metallic bushing portion which penetrates the fitting wall comprises a bushing opening and to which an excess pressure safety device that opens when elevated internal pressures occur such that a grounded potential terminal is arranged at the mounting point of the excess pressure safety device.

The advantages of the invention are that the excess pressure safety device responds to prevent inadmissably high pressures and thereby allows gases to flow out until the permissible pressure is obtained and then automatically again closes. A further advantage of the invention is that the combined function composed of a grounded potential bushing and an excessive pressure safety device can be mounted into already existing openings of the original grounded potential lead through. Thus, additional assembly jobs or operations on the fitting units are eliminated. The grounded potential guide thus utilizes the metallic housing portion of the excess pressure safety device and a number of various connecting possibilities can be made with such structure.

Other objects, features and advantages of the invention will be readily apparent from the following description of certain preferred embodiments thereof taken in conjunction with the accompanying drawings although variations and modifications may be effective without departing from the spirit and scope of the novel concepts of the disclosure and in which:

BRIEF DESCRIPTION OF THE DRAWINGS

FIG. 3 shows a third exemplary embodiment of the invention.

DESCRIPTION OF THE PREFERRED EMBODIMENTS

Figure 1:
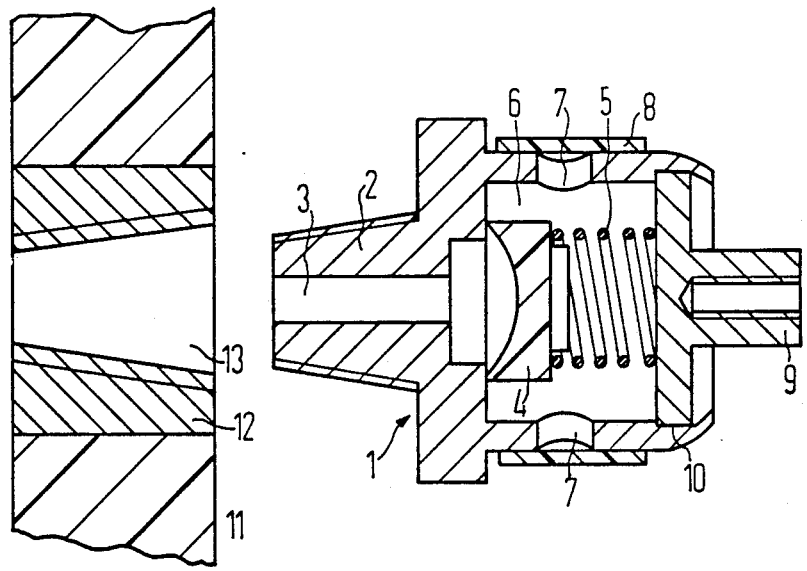
FIG. 1 illustrates a first exemplary embodiment of the pressure release device of the invention.

FIG. 1 illustrates on the left portion thereof a cutaway portion of a plastic box 11 which is provided with a lead-through opening 13 for a bushing collar 12 made of metal or other conductive material. The pressure-tight grounded potential bushing of the invention comprising the combination of the grounded potential bushing and an excess pressure safety device can be screwed into the lead screw opening 13 and collar 12 of the lead-through opening 13 is provided with threads which are slightly conical in shape. The housing of the excess pressure safety device 1 is made of metal and is suitable as a lead-through of the grounded potential. It is provided with a conical portion 2 which has threads on its outer surface which mate with the threads of the bushing 12 mounted in the box 11. The grounded potential terminal 9 is mounted in the other end of the housing of the excess pressure safety device 1 and includes a connection grounded potential terminal 9 which may be threaded for mating with a suitable ground lead. The grounded potential terminal 9 is inserted into the housing of the pressure safety device 1 and is sealed with a lateral seal 10. In the interior 6 of the housing of the excess safety device 1, there is provided a flow channel 3 which leads to the interior of the box when the safety device 1 is mounted in the bushing 12. The excess pressure safety element comprises a seat member 4 which covers the inner opening of the flow channel 3 and which is biased by a spring 5 against the end of the opening 3 so as to seal the end of the opening 3 up to a predetermined pressure. The contact pressure defined by the spring element 5 is selected such that the sealing element 4 moves from its seat over the end of the opening of the flow channel 3 when the pressure inside the box goes above an allowable limit such that the gas is discharged into the interior 6 and out openings 7 provided in the housing of the safety device 1. The outwardly leading discharge openings 7 are covered by a resilient elastic protective ring 8 which allows gas to pass out the openings 7, but which otherwise protects the safety elements 4 and 5 mounted in the interior against contamination and prevents excess water from passing into the interior 6.

Thus, in use, the safety device 1 is mounted in the opening 13 of the bushing 12 and the member 4 seals the opening 3 as long as the pressure within the box 11 is less than a predetermined value. When the pressure in the box exceeds such value, the valve seat member 4 moves to the right relative to FIG. 1 and the gas from the inside the box moves through the opening 3 pass the member 4 and out the openings 7 to thus relieve the pressure within the box 11 to the preset limits. At this time, the member 4 reseats due to the action of the spring 5.

Figure 2:
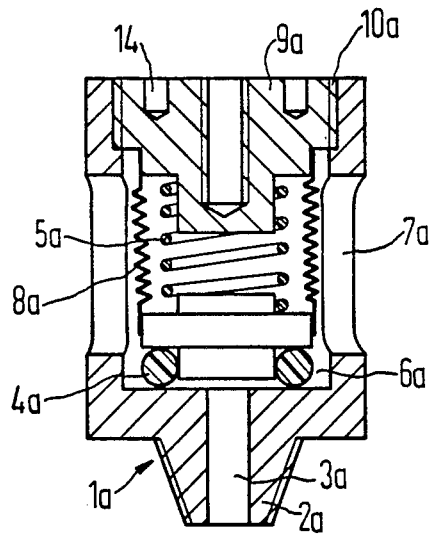
FIG. 2 illustrates a second exemplary embodiment of the invention.

FIG. 2 illustrates a modification of the excess pressure safety device and comprises excess pressure safety device 1a which has a portion 2a that is conically threaded so as to be received in the threaded portion of the bushing 12. The portion 2a is formed with an opening 3a which leads into the interior 6a of the device 1a. A valve arrangement limits the pressure and comprises O-ring sealing element 4a mounted about the opening 3a and which is biased by a spring 5a and a sealing member about the opening 3a. A bellow-shaped collar 8a comprises a safety element and prevents the spring 5a from being restricted. Discharge opening 7a are formed in the housing of the safety device 1a of the grounded potential bushing and provide a direct outflow path toward the outside of the discharge gas in case of malfunction. The terminating portion of the grounded potential terminal 9a has one end face screwed into the housing of the safety device 1a and is provided with openings 14 in its end face to allow a screwing tool to be inserted for tightening it. It is also possible that the grounded terminal 9a can be connected using screws. In the embodiment illustrated in FIG. 2, a spring element 5a determines the contact pressure of the sealing element 4a and, thus, defines the point at which response to excessive pressure will occur.

FIG. 3 illustrates another examplary embodiment of the safety device 1b which has an insertable portion 2b which is externally threaded so as to be received in the opening 13 of the bushing 12. The excess pressure safety portion 4b and 5b with a grounded potential terminal 9b can be threaded onto the threaded collar of the portion 2b such that the tension in the spring 5b can be adjusted to set the release pressure of the device. The O-ring 4b is seated about the opening which passes through the portion 2b and the spring 5b biases the ring 4b into sealing engagement between the member 4b and the spring holder. Discharge opening 7b are formed in the insert portion 2b and are protected by a plate 8b as shown. At the projecting end of the housing the grounded potential terminal 9b is provided with threads into which a screw for attaching the lead wire can be mounted.

The sealing member 4, 4a or 4b in these embodiments can be fashioned as a ring or as a plate. When using the plate shape, it is expedient to shape the edges so that they are lip-like so as to guarantee better sealing.

Although the invention has been described with respect to preferred embodiments, it is not to be so limited as changes and modifications can be made which are within the full intended scope of the invention as defined by the appended claims.

We claim as our invention:

1. A pressure-tight grounded potential device for a sealed cable fitting which has an outer wall and which contains ressurized gas comprising, a metal bushing mounted in said outer wall of said cable fitting and said bushing formed with a conical-shaped threaded lead-through opening which extends through said outer wall, an excess pressure safety device which has an extending threaded conical-shaped portion with a flow-through channel that is threadedly received into said metal bushing such that said flow-through channel in said conical-shaped portion communicates with said lead-through opening of said bushing, said excess pressure device having an inner opening into which said flow-through channel communicates, a seat member mounted in said excess pressure device so as to close said inner opening, a spring mounted in said excess pressure device to hold said seat member is the closed position, a discharge opening fomred in said excess pressure device, a rubber like resilient protective sealing element mounted to said excess pressure device to allow gas to escape from said discharge opening of said pressure device and to prevent dirt from reaching said spring, an end of said excess pressure device bears against an end of said spring, and a ground potential terminal mounted on said excess pressure device.

2. A pressure-tight grounded potential device according to claim 1, characterized in that said protective element (8) is arranged over said discharge opening (7) and is formed as a stretchable ring.

3. A pressure-tight grounded potential device according to claim 1, characterized in that said protective element (8a) is arranged over said spring (5a) and is formed as a bellows-shaped cylinder.

4. A pressure-tight grounded potential device according to claim 1, characterized in that said seat member (4) is formed as a plate.

5. A pressure-tight grounded potential device according to claim 1, characterized in that said seat member (4a) is formed as a ring.

6. A pressure-tight grounded potential device according to claim 1, characterized in that said protective sealing element (8b) is formed as a plate and is at an end face of the excess pressure safety device (1b) over said discharge opening.

7. A pressure tight grounded potential device according to claim 1 wherein said end of said excess pressure device is threaddly connected to said excess pressure device.

* * * * *